(12) United States Patent
Olszewski et al.

(10) Patent No.: US 9,100,143 B1
(45) Date of Patent: Aug. 4, 2015

(54) ADAPTING AN OPERATING MODE OF A SIGNAL PROCESSOR

(71) Applicant: L-3 Communications Corp., New York, NY (US)

(72) Inventors: Kim J. Olszewski, Rancho Palos Verdes, CA (US); Joshua D. Gunn, Farmington, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 14/155,648

(22) Filed: Jan. 15, 2014

(51) Int. Cl.
*H04L 1/00* (2006.01)

(52) U.S. Cl.
CPC ............ *H04L 1/0021* (2013.01); *H04L 1/0036* (2013.01)

(58) Field of Classification Search
USPC .................................. 375/341, 343, 346, 350
See application file for complete search history.

(56) References Cited

U.S. PATENT DOCUMENTS

2006/0291553 A1* 12/2006 Nemer .......................... 375/233

OTHER PUBLICATIONS

Banovic, "Adaptive Equalization: A Tutorial," University of Windsor (Oct. 14, 2005), 25 pages.
Benveniste et al., "Blind equalizers," IEEE Transactions on Communications, vol. COM-32, No. 8 (Aug. 1984), pp. 871-883.
BasseVille et al., "Sequential Detection of Abrupt Changes in Spectral Characteristics of Digital Signals," IEEE Transactions on Information Theory, vol. IT-29, No. 5 (Sep. 1983), pp. 709-724.
Segen et al., "Detecting Change in a Time Series," IEEE Transactions on Information Theory, vol. IT-26, No. 2 (Mar. 1980), pp. 249-255.
Hung et al., "Variable-Step-Size Multimodulus Blind Decision-Feedback Equalization for High-Order QAM Based on Boundary MSE Estimation," IEEE (2004), pp. 881-884.
Wei et al., "A Variable Step Size Blind Equalization Algorithm for QAM Signals," ICMMT 2010 Proceedings, IEEE (2010), pp. 1801-1804.
Ashmawy et al., "Joint MCMA and DD blind equalization algorithm with variable-step size," IEEE (2009), pp. 174-177.
Hung et al., "A Hybrid Variable Step-Size Adaptive Blind Equalization Algorithm for QAM Signals," IEEE Globecom 2005 (2005), pp. 2140-2144.

* cited by examiner

*Primary Examiner* — Kabir A Timory
(74) *Attorney, Agent, or Firm* — Kirton | McConkie (57) ABSTRACT

A multi-mode parameter adaptation module can comprise different modes for generating parameters to minimize an error between an output of an adaptive processor and an ideal output of the adaptive processor. A mode control module can monitor a performance signal p indicative of an operating condition a receiver of which the adaptive processor is a part. Upon detecting a change condition form the performance signal p, the mode control module can change the operating mode of the parameter adaptation module to suit the current operating condition.

34 Claims, 8 Drawing Sheets

Figure 10 ns of the invention.
ADAPTING AN OPERATING MODE OF A SIGNAL PROCESSOR

BACKGROUND

An adaptive signal processor can process digital samples of a communications signal in accordance with parameters that are adapted (changed) to, for example, reduce or minimize an error between an actual signal such as the output of the adaptive processor and an ideal or desired signal. A blind adaptive processor can begin processing a signal without first receiving and processing training data. Various techniques are known for changing parameters for an adaptive processor to minimize an error between an actual signal and a desired signal. Some such techniques are best suited for different operating conditions. Embodiments of the present invention are directed to multi-mode adaptive processing methods and devices that can select from among a plurality of available operating modes for generating parameters for an adaptive signal processor. Embodiments of the present invention can thus select the operating mode that best suits current and changing operating conditions. Embodiments of the invention provide these and other advantages.

SUMMARY

In some embodiments, a process of controlling an operating mode of a multi-mode parameter adaptation module in a communications receiver can include processing with an adaptive processor digital samples $y_n$ of a received signal y comprising symbols to produce processed digital samples $\hat{x}_n$. The process can also include generating with a multi-mode parameter adaptation module in a first of a plurality of operating modes parameters for the adaptive processor that minimize an error between the processed digital samples $\hat{x}_n$ and a desired output of the adaptive processor, and monitoring a performance signal p indicative of an operating condition of the receiver. The process can also include, upon detecting a change in the performance signal p, changing an operating mode of the adaptation module to a second of the plurality of operating modes, wherein the multi-mode parameter adaptation module generates the parameters in the second operating mode.

In some embodiments, a signal processing apparatus can include a multi-mode parameter adaptation module, and a mode control module. The multi-mode parameter adaptation module can be configured to generate, in a plurality of different operating modes, parameters for an adaptive processor that minimizes an error between processed digital samples $\hat{x}_n$ output by the adaptive processor and a desired output of the adaptive processor. The mode control module can be configured to monitor a performance signal p indicative of an operating condition of the signal processing apparatus, and upon detecting a change in the performance signal p, change an operating mode of the adaptation module.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

As used herein, "substantially" means sufficient to work for the intended purpose. The term "ones" means more than one.

A "bit" is a binary digit having two possible states, which are expressed herein in as a "zero" and a "one."

References herein to a signal include the signal in any format including without limitation a sequence of digital samples.

The following mathematical symbols have the meanings indicated: "+" means mathematical addition, "−" means mathematical subtraction, "*" means mathematical multiplication, and "/" means mathematical division.

Figure 1:
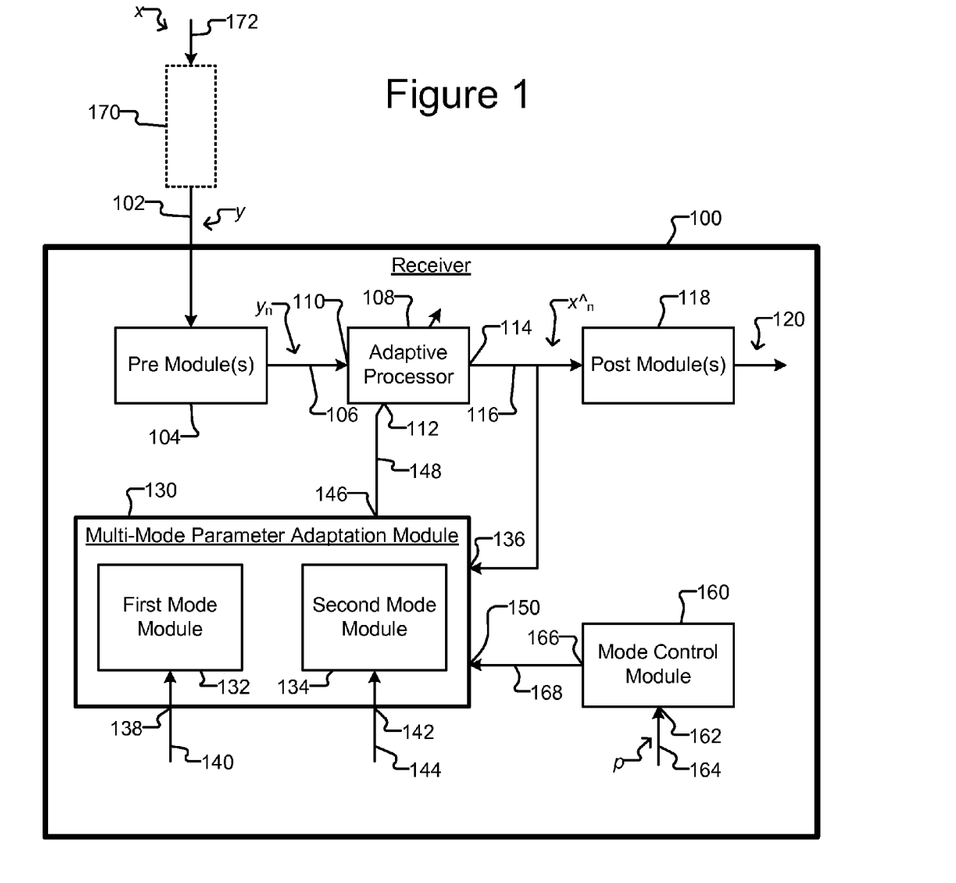
FIG. 1 illustrates a communications receiver according to some embodiments of the invention.

FIG. 1 illustrates an example of a receiver 100 that can receive a transmitted signal x 172, which can be a band pass signal comprising a sequence of symbols (not shown). The symbols can be part of a symbol constellation in which each symbol in the constellation can represent a different pattern of one or more bits. As shown in FIG. 1, the transmitted signal x 172 can be transmitted through a channel 170 to the receiver 100. The transmitted signal x 172 is referred to as a received signal y 102 at the receiver 100. Because the transmitting device (not shown) and/or channel 170 typically distorts and/or combines noise with the transmitted signal x 172, the received signal y 102 is a distorted version of the transmitted signal x 172. The received signal y 102 can thus comprise the transmitted signal x 172 and combined (e.g., additive and/or multiplicative) distortion and noise components.

As shown, the receiver 100 can comprise pre-module(s) 104, an adaptive processor 108, a multi-mode parameter adaptation module 130 (referred to hereinafter more simply as an adaptation module 130), a mode control module 160, and post-module(s) 118. The pre-module(s) 104 can demodulate the received signal y 102 and produce digital samples $y_n$ 106 of the received signal y 102, where $y_n$ is the nth sample of the received signal y 102. The samples $y_n$ 106 can represent the symbols of the transmitted signal x 172.

As noted above, each sample $y_n$ can comprise a sample that corresponds to the transmitted signal x 172 and combined distortion/noise. The adaptive processor 108, among other things, can attempt to remove the distortion/noise from the digital samples $y_n$ 106. The adaptive processor 108 provides at its output 114 processed versions of $y_n$, which are referred to herein as processed samples $\hat{x}_n$ 116, where $\hat{x}_n$ connotes an attempt to reproduce the corresponding sample $x_n$ from the transmitted signal x 172. The post-module(s) 118 can produce from the processed digital samples $\hat{x}_n$ 116 the symbols 120 of the transmitted signal x 172. The symbols 120 produced by the post-module(s) 118 can be described as decoded symbols, which should correspond to the symbols of the transmitted signal x 172.

The adaptation module 130 can generate changing parameters 148 for the adaptive processor 108 that seek to minimize an error between the processed digital samples $\hat{x}_n$ 116 and an ideal output 114 of the adaptive processor 108 (e.g., corresponding samples of the transmitted signal x or estimates of those samples $x_n$). The mode control module 160 can select and change an operating mode of the adaptation module 130 in accordance with changing operating conditions of the receiver 100. Because the operating condition of the channel 170 affects the receiver 100, references herein to an operating condition of the receiver 100 can include the operating condition of the channel 170.

The pre-module(s) 104 can comprise one or more modules for receiving a band pass signal (e.g., the received signal y 102) comprising symbols each representing one or more bits and processing the band pass signal to produce digital samples (e.g., samples $y_n$ 116) of the band pass signal. The post-module(s) 118 can comprise one or more modules for processing digital samples (e.g., the processed digital samples $\hat{x}_n$ 116) of the band pass signal to re-produce the symbols (e.g., 120) of the band pass signal. Modules corresponding to the pre-module(s) 104 and post-module(s) 118 are well known.

As shown in FIG. 1, the adaptive processor 108 can comprise a sample input 110, a parameter input 112, and an output 114. The adaptive processor 108 can process the digital samples $y_n$ 106 received at the sample input 110 in accordance with parameters 148 received at the parameter input 112 to produce the processed samples $\hat{x}_n$ 116 at the output 114. The adaptive processor 108 can be configured to perform any of many different digital processing functions. For example, the adaptive processor 108 can perform digital filtering, channel equalization, channel estimation, event detection, interference mitigation, signal separation, signal quantization, and/or the like. The adaptive processor 108 can comprise, for example, one or more finite impulse response (FIR) filters and/or one or more infinite impulse response (IIR) filters, and the parameters 148 can be weights of those filters.

The adaptive processor 108 can be a blind adaptive processor. As is known, a blind adaptive processor does not require or utilize a training data sequence prior to starting operation. Rather, a blind adaptive processor 108 can begin processing signal data without first receiving or processing a sequence of training data.

As shown, the adaptation module 130 can comprise a plurality of mode modules 132, 134 (two are shown but there can be more). Each mode module 132, 134 can correspond to a different operating mode of the adaptation module 130, which can thus have two or more operating modes. Each mode module 132, 134 can generate and change parameters 148 in accordance with a different algorithm.

The adaptation module 130 can comprise a processor input 136; reference inputs 138, 142 (two are shown but there can be more) for the mode modules 132, 134; a mode control input 150; and a parameter output 146. The foregoing inputs and outputs of the adaptation module 130 are examples only. For example, in some embodiments, the adaptation module 130 does not include one or both of reference inputs 138, 142. Regardless, the adaptation module 130 can continuously generate and change, as needed, the parameters 148 for the adaptive processor 108. As mentioned, the parameters 148 can be weights of FIR filters and/or IIR filters of the adaptive processor 108. The adaptation module 130, or more specifically, a selected one of the mode modules 132, 134, can generate and change the parameters 148 in order to optimize operation of the adaptive processor 108. For example, the adaptation module 130 can generate and change the parameters 148 to minimize an error (e.g., a mean squared error) between the processed samples $\hat{x}_n$ 116 produced by the adaptive processor 108 and a desired output 114 of the adaptive processor 108. As mentioned, the desired output 114 of the adaptive processor 108 can be corresponding samples $x_n$ of the transmitted signal x 172 or estimations or approximations of those samples $x_n$.

Each mode module 132, 134 can be configured to generate the parameters 148 in accordance with a different algorithm, and each mode module 132, 134 can receive a different reference signal 140, 144. As noted, in some embodiments, a mode module 132, 134 can be configured to generate the parameters 148 without utilizing one or both of reference signals 140, 144. Each mode module 132, 134 can also utilize a different step size to generate parameters 148. The algorithm, reference signal 140, 142, and step size of each mode module 132, 134 can be best suited for a particular operating condition of the receiver 100, and the mode control module 160 can select and switch between the mode modules 132, 134 based on current and changing operating conditions of the receiver 100. For example, one mode module (e.g., 132) can be used at start up and when operating conditions of the receiver 100 deteriorate, and the other mode module (e.g., 134) can otherwise be used.

The mode control module 160 can control the operating mode of the adaptation module 130 and thus select which of the mode modules 132, 134 generates the parameters 148. As shown, the mode control module 160 can comprise a performance input 162 for receiving a performance signal p 164, which can be a signal or signals from the pre-module(s) 104, the adaptive processor 108, and/or the post-module(s) 118 that is indicative of the current operating conditions of the receiver 100. For example, the performance signal p 164 can correspond to an error rate (e.g., a measured error rate or an estimated error rate) in the received signal y 102. The mode control module 160 can utilize the performance signal p 164 to select one of the operating modes (that is, one of the mode modules 132, 134) of the adaptation module 130 and output a mode control signal 168 accordingly. The mode control module 160 can thus select the operating mode of the adaptation module 130 in accordance with the current operating conditions of the receiver 100 as indicated by the performance signal p 164. The performance signal p 164 can be an analog signal or a sequence of digital samples $p_n$. References herein to the performance signal p 164 include analog form, digital sample form, or other forms.

As mentioned, the parameter generation algorithms of the mode modules 132, 134 can utilize different step sizes to generate the parameters 148. Alternatively, the mode control module 160 can provide a step size to the adaptation module 130, and the step size can correspond to the current operating condition of the receiver 100 as indicated by the performance signal p 164. For example, the mode control module 160 or the adaptation module 130 can utilize a digital data look up table (not shown) to identify a particular step size that corresponds to the current operating condition of the receiver 100 as indicated by the performance signal p 164.

Figure 2:
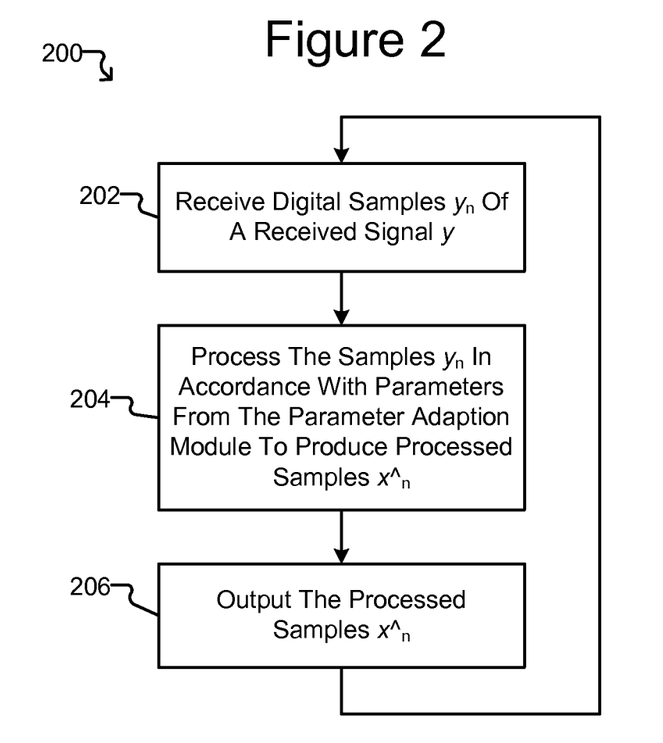
FIG. 2 shows an example of a process that can be performed by the adaptive processor of FIG. 1 according to some embodiments of the invention.
Figure 3:
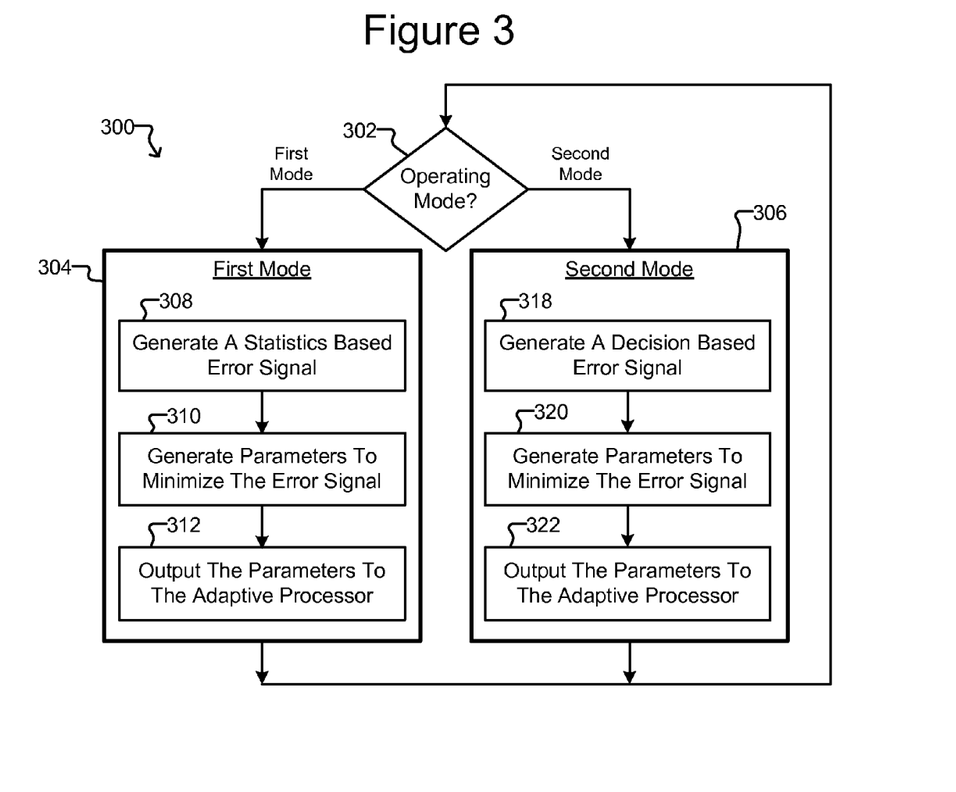
FIG. 3 is an example of a process that can be performed by the multi-mode parameter adaptation module of FIG. 1 according to some embodiments of the invention.
Figure 4:
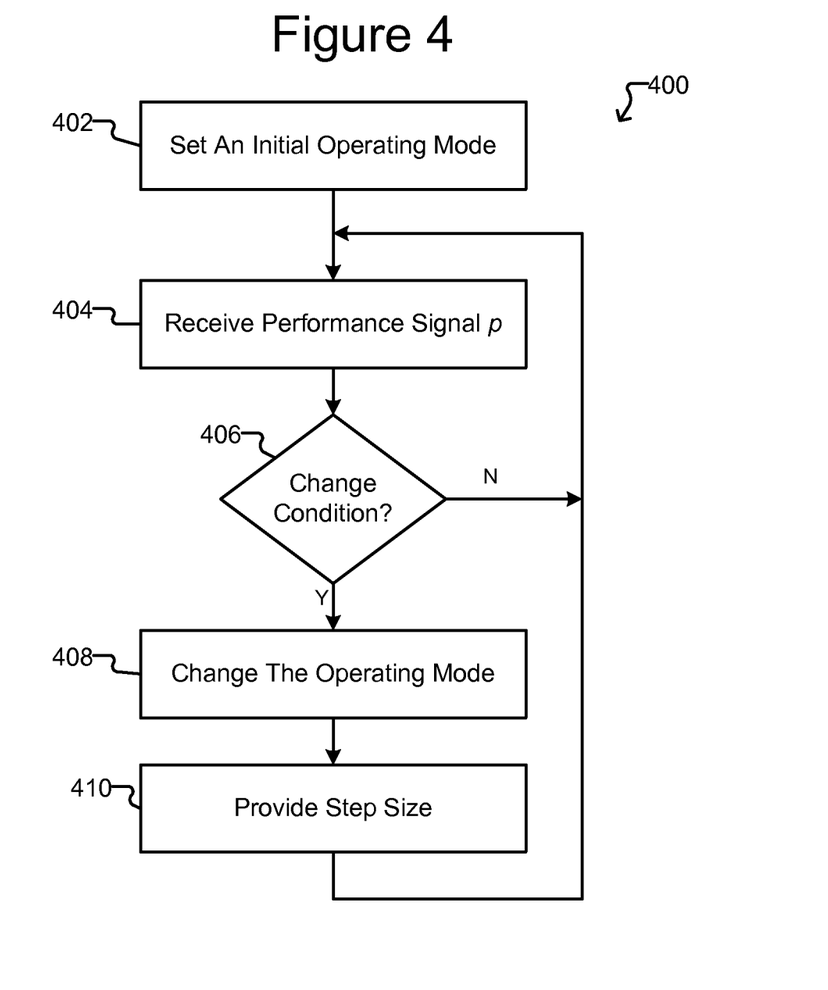
FIG. 4 shows an example of a process that can be performed by the mode control module of FIG. 1 according to some embodiments of the invention.

FIGS. 2 through 4 illustrate examples of operation of the adaptive processor 108, the adaptation module 130, and the mode control module 160.

The process 200 of FIG. 2 illustrates an example operation of the adaptive processor 108. With reference to FIGS. 1 and 2, at step 202, the adaptive processor 108 can receive at its sample input 110 digital samples $y_n$ 106 of the received signal y 102 as discussed above. At step 204, the adaptive processor 108 can perform one or more digital processing functions on the digital samples $y_n$ 106 in accordance with the current parameters 148 from the adaptation module 130 generally as discussed above, and the resulting processed samples $\hat{x}_n$ 116 can be output 114 by the adaptive processor 108 at step 206. As noted, the adaptation module 130 can change the parameters 148, and the adaptive processor 108 can thus process the samples 106 in accordance with changing parameters 148. Step 204 can include the option of performing no processing on the samples $y_n$. For example, a pass-through mode can be a possible operating mode of the adaptive processor 108 in which the adaptive processor 108 merely passes input samples $y_n$ at the sample input 110 unchanged to the output 114.

The process 300 of FIG. 3 illustrates an example operation of the adaptation module 130. As shown in FIGS. 1 and 3, the overall operation of the process 300 can be as follows. At step 302, the process 300 can determine an operating mode. For example, the operating mode can be determined from the mode select signal 168 at the mode input 150 of the adaptation module 130. As another example, the current operating mode can be set internal to the adaptation module 130 and changed by the mode select signal 168, which can, in some embodiments, toggle the adaptation module 130 among different operating modes.

As shown in FIG. 3, if the operating mode is the first mode, the process 300 can perform step 304, where the first mode module 132 can generate parameters 148 in accordance with a first algorithm and the first reference signal 140 at input 138. If the operating mode is the second mode, the process 300 can perform step 306, where the second mode module 134 can generate parameters 148 in accordance with a second algorithm and the second reference signal 144 at input 142.

FIG. 3 illustrates an example of step 304 in which the first mode module 132 generates parameters 148 in accordance with a statistics-directed algorithm. At step 308, the first mode module 132 can utilize the reference signal 140 to generate a statistics-based error signal (not shown) between the processed samples $\hat{x}_n$ 116 output 114 by the adaptive processor 108 and an ideal output 114. As noted, however, the reference signal 140 is not present or utilized in some embodiments, and the process 300 can, in such embodiments, generate a statistics based error signal without a reference signal 140.

If present, the first reference signal 140 can be any signal from anywhere in the pre-module(s) 104, the adaptive processor 108, and/or the post-module(s) 118. For example, the first reference signal 140 can be the digital samples $y_n$ 106 that are input 110 to the adaptive processor 108. The first mode module 132 can utilize the reference signal 140 and statistical information regarding the received signal y 102 to generate an error signal (which can thus be a statistics-based error signal) with respect to the processed samples $\hat{x}_n$ 116. For example, the first mode module 132 can generate the statistics-based error signal (not shown) as a difference between the processed samples $\hat{x}_n$ 116 produced by the adaptive processor 108 and dispersion constants derived from statistics of the constellation of the symbols in the transmitted signal x 172.

At step 310, the first mode module 132 can generate parameters 148 for the adaptive processor 108 to minimize the statistics-based error signal generated at step 308. For example, the first mode module 132 can generate parameters 148 to minimize the mean squared value of the statistics-based error signal. Such statistics driven algorithms are known and include multi-modulus algorithms. The first mode module 132 can use any such statistics driven algorithm to generate parameters 148 for the adaptive processor 108. At step 312, the adaptation module 130 can output the parameters 148 to the adaptive processor 108. Steps 308 through 312 can be performed continuously, and thus when selected, the first mode module 132 can continuously generate, changing as needed, the parameters 148 by which the adaptive processor 108 produces the processed samples $\hat{x}_n$ 116.

FIG. 3 also illustrates an example of step 306 in which the second mode module 134 generates parameters 148 in accordance with a decision-directed algorithm. At step 318, the second mode module 134 can utilize the reference signal 144 to generate a decision-based error signal (not shown) that represents the difference between the processed samples $\hat{x}_n$ 116 produced by the adaptive processor 108 and what corresponds to an ideal or desired output 114 of the adaptive processor 108 as determined from a signal inside or otherwise produced by the post-module(s) 118. For example, the reference signal 144 can correspond to the symbols 120 output by the post-module(s) 118, and the second mode module 134 can generate the decision-based error signal (not shown) in accordance with a difference between the symbols 120 and the processed samples $\hat{x}_n$ 116 output 114 by the adaptive processor 108.

At step 320, the second mode module 134 can generate parameters 148 for the adaptive processor 108 to minimize the decision-based error signal generated at step 318. For example, the second mode module 134 can generate parameters 148 to minimize the mean squared value of the decision-based error signal. Such decision driven algorithms are known, and the second mode module 134 can use any such decision driven algorithm to generate parameters 148 for the adaptive processor 108. At step 322, the adaptation module 130 can output the parameters 148 to the adaptive processor 108. Steps 318 through 322 can operate continuously, and thus when selected, the second mode module 134 can continuously generate, changing as needed, the parameters 148 by which the adaptive processor 108 produces the processed samples $\hat{x}_n$ 116.

As noted above, the second mode module 134 can utilize a different step size than the first mode module 132 to generate parameters 148. The step size utilized to generate parameters 148 can thus correspond to the operating mode of the adaptation module 130.

The process 400 of FIG. 4 illustrates an example operation of the mode control module 160, which is described below with reference to FIGS. 1 and 4. At step 402, the mode control module 160 can set an initial operating mode for the adaptation module 130, which can be the operating mode best suited for start-up operation of the receiver 100. In the example discussed above in which the first mode module 132 utilizes a statistics-directed algorithm and the second mode module 134 uses a decision-directed algorithm, the initial mode set at step 402 can be the statistics-directed algorithm, which can corresponds to the first mode module 132.

Typically, a decision-directed algorithm can reduce an error signal more than a statistics-directed algorithm. A decision-directed algorithm, however, is more likely to be unstable during start up and under conditions in which the receiver 100 or channel 170 are subject to significant distortions and thus high levels of distortion and errors in the received signal y 102. In contrast, a statistics-directed algorithm is typically stable in the foregoing conditions. Thus, in some embodiments, the mode control module 130 can select the statistics-directed mode corresponding to the first mode module 132 in the above-discussed example as the initial operating mode at step 402.

Regardless, the mode control module 160 can set the initial mode at step 402 by providing a mode select signal 168 to the adaptation module 130. Although not shown, the mode control module 160 can also provide an initial step size to the adaptation module 130 for generating parameters 148.

At step 404, the mode control module 160 can begin receiving the performance signal p 164. As noted below, the source or nature of the performance signal p 164 can be changed during continued operation of the process 400. The performance signal p 164 can be any signal or signals from anywhere in the pre-module(s) 104, the adaptive processor 108, and/or the post-module(s) 118 that correspond to an operating condition of the receiver 100, which can include a condition of the channel 170. For example, the performance signal p 164 can correspond to an error rate (which can be measured or estimated) in the received signal y 102.

Suitable examples of the performance signal p 164 include the following. The performance signal p 164 can be the same as the decision-based error signal (not shown) generated by the second mode module 134. As another example, the performance signal p 164 can be the same as the statistics-based error signal (not shown) generated by the first mode module 132. As yet another example, the performance signal p 164 can be a difference between the samples $y_n$ 106 input 110 to the adaptive processor 108 and the processed samples $\hat{x}_n$ 116 output 114 by the adaptive processor 108. As yet another example, the performance signal p 164 can be or correspond to one of the reference signals 140, 144 provided to the adaptation module 130. As still another example, the performance signal p 164 can be a difference between the symbols 120 output by the post-module(s) 118 and the digital samples $y_n$ 106 of the received signal y 102.

Figure 5:
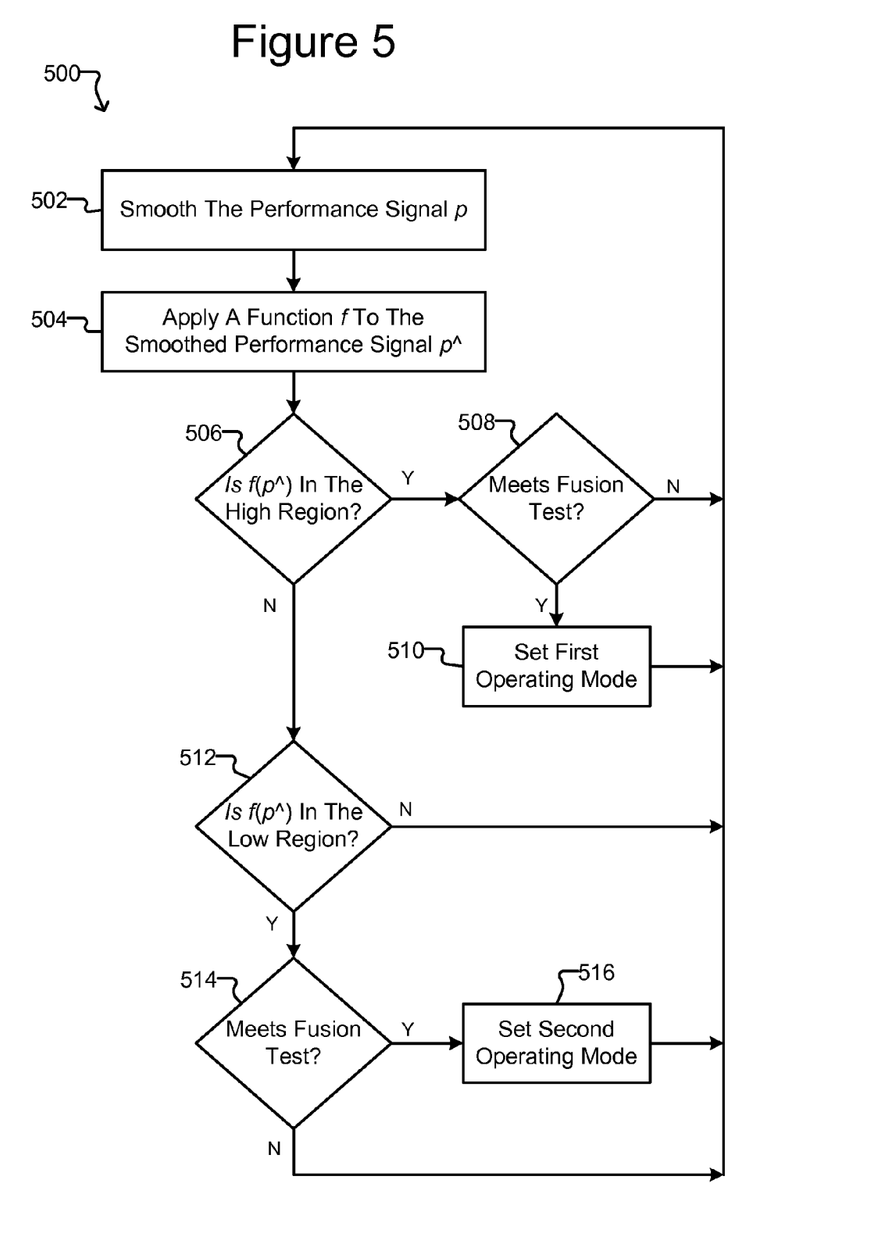
FIG. 5 is an example of a process for performing the step of identifying a change condition in FIG. 4 according to some embodiments of the invention.

At step 406, the mode control module 160 can determine whether the performance signal p 164 received at step 404 indicates a change condition for changing the operating mode of the adaptation module 130. For example, the mode control module 160 can analyze the performance signal p 164 or a processed form of the performance signal p 164 for a change point, which can be a change in the probabilistic characteristics of the performance signal p 164 or a processed form of the performance signal p 164. FIG. 5, which is discussed below, illustrates an example process 500 for determining whether the performance signal p indicates a change condition.

Continuing with the discussion of FIG. 4, if a change condition is not detected at step 406, the mode control module 160 can continue receiving the performance signal p 164 at step 404 and determining at step 406 whether the performance signal p 164 indicates a change condition. The mode control module 160 can thus continuously receive and monitor the performance signal p 164 for a change condition.

When a change condition is detected at step 406, the mode control module 160 can, at step 408, change the operating mode of the adaptation module 130. The mode control module 160 can, at step 408, change the operating mode of the adaptation module 130. For example, mode control module 160 can provide a mode select signal 168 that selects one of the operating modes of the adaptation module 130, for example, by selecting one of the mode modules 132, 134. As another example, the mode select signal 168 can toggle among different operating modes of the adaptation module 130.

At step 410, the mode control module 410 can provide a step size to the adaptation module 130 for generating parameters 148. The step size can be, for example, an optimal step size for the operating mode to which the adaptation module 130 is changed at step 408. In some embodiments, the step size can correspond to the performance signal p 164 and thus vary with operating conditions of the receiver 100.

Although not shown in FIG. 4, the process 400 can make additional or other changes upon detecting a change condition at step 406. For example, upon detecting a change condition at step 406, the process 400 can change the source or nature of the performance signal p 164.

As shown in FIG. 4, the adaptation module 130 can repeatedly perform steps 404 through 410. The mode control module 160 can thus continuously receive the performance signal p 164 and change the operating mode of the adaptation module 130 when the performance signal p 164 indicates a change condition.

Figure 6:
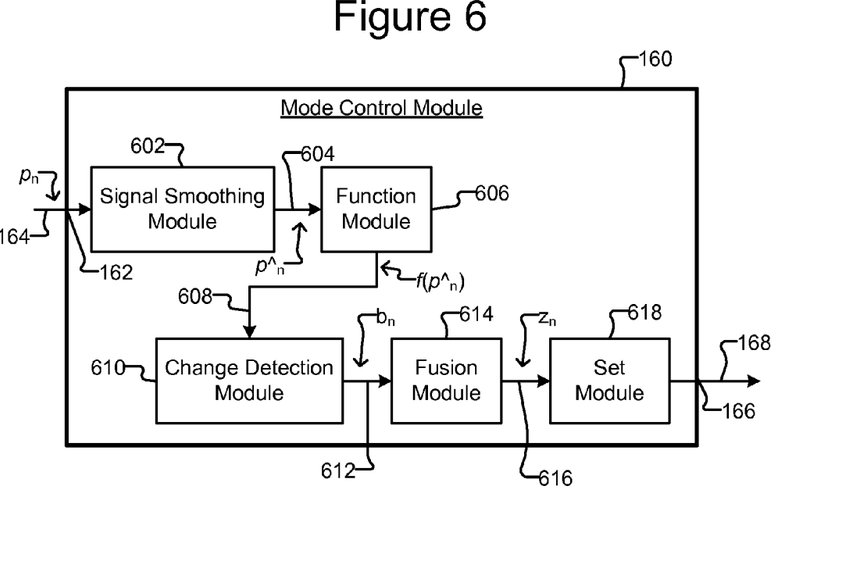
FIG. 6 illustrates an example configuration of the mode control module of FIG. 1 according to some embodiments of the invention.

As noted, FIG. 5 illustrates an example process 500 for determining whether the performance signal p 164 indicates a change condition. The process 500 is thus an example process by which step 406 of FIG. 4 can be performed. FIG. 6 illustrates an example configuration of the mode control module 160, which can perform the process 500.

With reference to FIGS. 5 and 6, at step 502, the mode control module 160 can smooth the performance signal p 164, which as noted can be in analog form or comprise a sequence of digital samples $p_n$. The signal smoothing module 602 of FIG. 6 can perform step 502.

As shown in FIG. 6, the signal smoothing module 602 can receive the performance signal p 164 and output a smoothed performance signal $\hat{p}$ 604. The smoothed performance signal $\hat{p}$ 604 can be in analog form or comprise a sequence of digital samples $\hat{p}_n$. In some embodiments, the signal smoothing module 602 can average the performance signal p 164. For example, the signal smoothing module 602 can comprise an averaging filter (e.g., an exponentially weighted moving average filter). The smoothed performance signal $\hat{p}$ 604 can thus be an average (e.g., an exponentially weighted moving average) of the performance signal p 164.

At step 504, the mode control module 160 can apply a function to the smoothed performance signal $\hat{p}$ 604 produced at step 502. The result is identified as $f(\hat{p})$ in FIG. 5, where p is the reference signal 168, $\hat{p}$ is the smoothed reference signal 604, and $f$ represents the function applied to the smoothed reference signal 604. The function $f$ can be for example, a mathematical function, which can be linear, non-linear, continuous, non-continuous, or the like. In some embodiments, the function $f$ can be a log likelihood ratio (LLR). Regardless, the function module 606 of FIG. 6 can perform step 504, and output $f(\hat{p})$ 608 as shown.

Alternatively, the process 500 does not include the smoothing step 502, and the mode control module of FIG. 6 does not include the signal smoothing module 602. In such embodiments, the function $f$ can be applied to the performance signal p resulting in $f(p)$. Thus, in all discussions and illustrations herein, $f(p)$ can replace $f(\hat{p})$.

Figure 7:
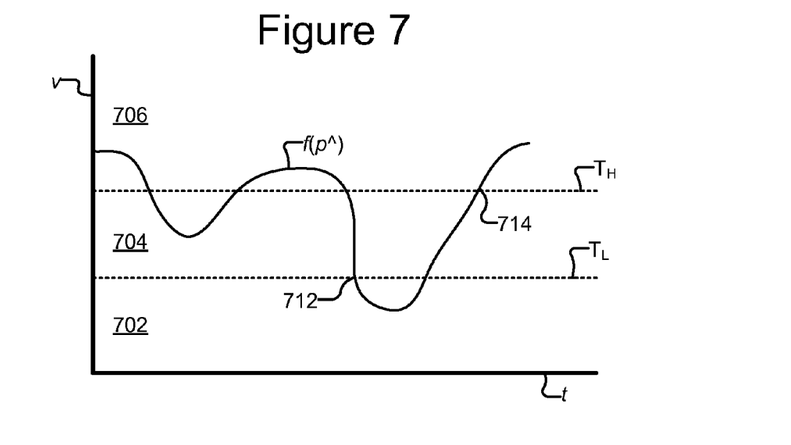
FIG. 7 shows an example of dual threshold testing for a change condition according to some embodiments of the invention.

Regardless, at steps 506 and 512, the mode control module 160 can determine whether $f(\hat{p})$ 608 indicates a change condition utilizing a dual threshold detection test. FIG. 7 illustrates an example of the dual threshold detection test.

In FIG. 7, axis v is the value of $f(\hat{p})$ 608, and axis t is time. An example plot of the values v of $f(\hat{p})$ 608 verses time t is shown. The dual threshold detection test can involve two threshold values v: a high threshold value $T_H$, and a low threshold value $T_L$. As shown, the high threshold value $T_H$ can be a particular value v, and the low threshold value $T_L$ can be a lesser value of v. A high region 706 can include values v that are greater than the high threshold $T_H$, and a lower region 702 can include values v that are less than the threshold $T_L$. As also shown, there can be a band of values v, and thus a gap 704, between the high threshold $T_H$ and the low threshold $T_L$. It can be pre-decided which region 702, 704, 706 the thresholds $T_H$, $T_L$ are in. Thus, the high region 706 can include values v that are greater than or equal to the high threshold $T_H$, and a lower region 702 can include values v that are less than or equal to the threshold $T_L$.

While $f(\hat{p})$ 608 is in the high region 706, the control module 160 can set the parameter adaptation module 130 to a first operating mode by selecting the first mode module 132. While $f(\hat{p})$ 608 is in the low region 702, the control module 160 can set the parameter adaptation module 130 to a second operating by selecting the second mode module 134. While $f(\hat{p})$ 608 is in the gap region 704, the operating mode of the parameter adaptation module 130 can be left unchanged and thus be in either the first operating mode or the second operating mode.

Thus, at step 506, the mode control module 160 can determine whether $f(\hat{p})$ 608 is greater than or equal to the high threshold $T_H$ and therefore in the high region 706. If so, the mode control module 160 can perform a fusion test at step 508, and set the operating mode of the adaptation module 130 to the first operating mode at step 510 if the fusion test is positive. At step 512, the mode control module 160 can determine whether $f(\hat{p})$ 608 is less than or equal to the low threshold $T_L$ and therefore in the low region 702. If so, the mode control module 160 can perform a fusion test at step 514, and set the operating mode of the adaptation module 130 to the second operating mode at step 516 if the fusion test is positive. If the result of step 508, 512, or 514 is negative and following steps 510, 516, the mode control module 160 can return to steps 502 and 504 and thus continuously smooth the performance signal p 154, apply the function $f$ to the smoothed performance signal $\hat{p}$ 608, and determine whether $f(\hat{p})$ 608 enters the high region 706 or the low region 702. As noted above, some embodiments do not include step 502, in which case the output 608 of the function module 606 can be $f(p)$.

In the example shown in FIG. 7, between time t zero and point 712, the adaptation module 130 remains in the first operating mode (i.e., the first mode module 132 is selected). After point 712, the mode control module 160 switches the adaptation module 130 to the second operating mode assuming the fusion test at step 514 is positive. Similarly, between points 712 and 714, the adaptation module 130 remains in the second operating mode. After point 714, however, the mode control module 160 switches the adaptation module 130 to the first operating mode assuming the fusion test at step 508 is positive. As discussed above, the mode control module 160 can set and change the operating mode of the adaptation module 130 with the mode select signal 168.

The fusion tests at step 508, 514 can ensure that changes in the value v of $f(\hat{p})$ 608 into the high region 706 (step 508) or the low region 702 (step 514) are stable changes and not merely an errant spike or due to processing errors or inaccuracies. The fusion tests at step 508, 514 can thus be any test to determine that $f(\hat{p})$ 608 remains in the high region 706 (at step 508) or the low region 702 (at step 514) for a sufficient period to prevent a mere aberrant spike in $f(\hat{p})$ 608 from causing the mode control module 160 to change the operating mode of the adaptation module 130. Some embodiments, however, do not include fusion tests and thus lack steps 508, 514 of FIG. 5 and the fusion module 614 of FIG. 6.

Figure 8:
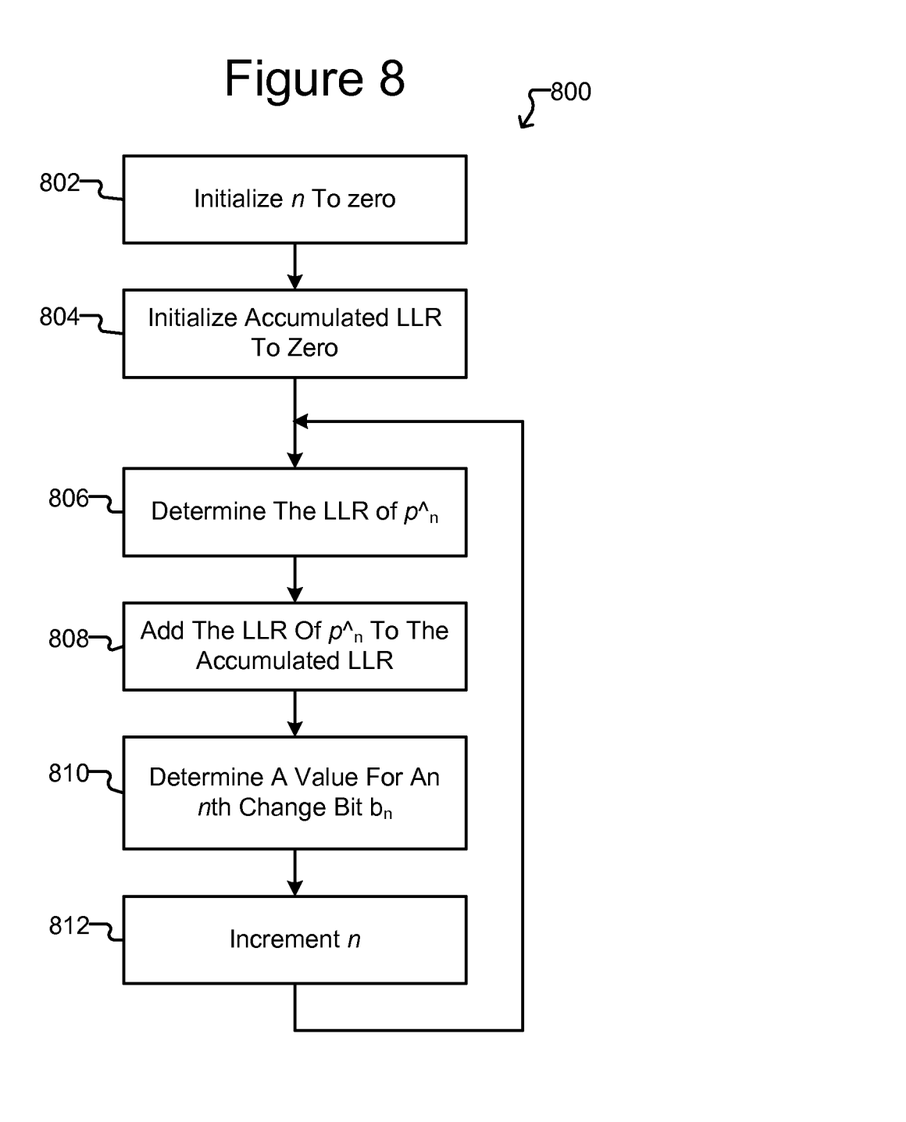
FIG. 8 is an example of a process of testing for a change condition that can be performed by the function module and change detection module of FIG. 6 according to some embodiments of the invention.
Figure 9:
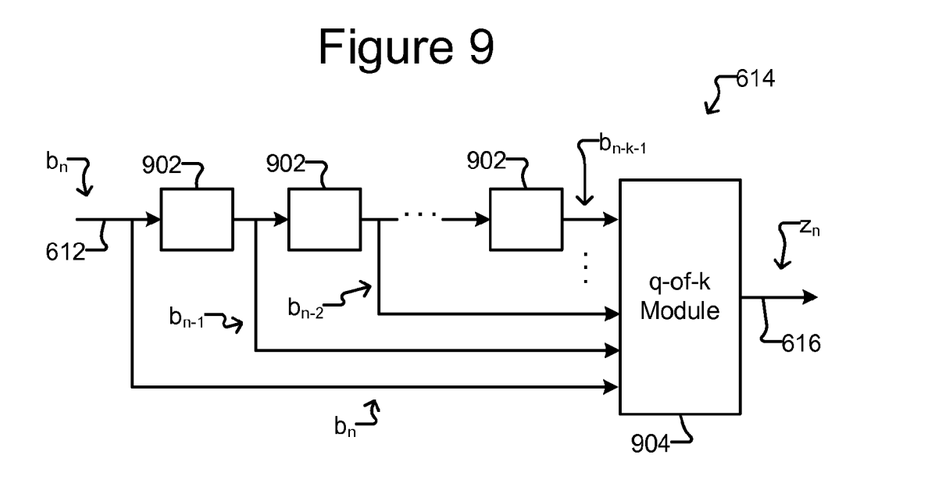
FIG. 9 is an example configuration of the fusion module of FIG. 6 according to some embodiments of the invention.

FIG. 8 illustrates an example operation of the function module 606 and change detection module 610 (see FIG. 6) in which the smoothed performance signal $\hat{p}$ 604 comprises a sequence of digital samples $\hat{p}_n$ and the function $f$ applied to the smoothed performance signal $\hat{p}$ 604 is an accumulating LLR function. The LLR function utilized in FIG. 8 is but an example and other types of functions can be used in place of an LLR function. The process 800 can thus also be an example implementation of steps 504, 506, and 512 of FIG. 5 in which step 502 provides the smooth performance signal $\hat{p}$ as a sequence of digital samples $\hat{p}_n$. FIG. 9 illustrates an example configuration of the fusion module 614 for performing a q-of-k fusion test on the results of the process 800, which can be the output 612 of the change detection module 610 (see FIG. 6).

As shown in FIG. 8 (and with reference to FIG. 6), at steps 802 and 804, the function module 606 can be initialized by setting n and an accumulated LLR to zero. At step 806, the function module 606 can determine the LLR of $\hat{p}_n$, which is the nth sample of the smoothed performance signal $\hat{p}$ from the signal smoothing module 602. (As noted, an LLR function is but an example and other types of functions can be used in place of an LLR function.) Alternatively, if the signal smoothing module 602 is not included, the function module 606 can, at step 806, determine the LLR of samples $p_n$ of the performance signal p 164. At step 808, the function module 606 can add the LLR determined at step 806 to the accumulated LLR. Because n and the accumulated LLR were set to zero at steps 802 and 804, the LLR determined at step 806 is the LLR of the first sample $\hat{p}_0$ of the smoothed performance signal $\hat{p}$ and the accumulated LLR is the LLR of $\hat{p}_0$. The accumulated LLR can be provided as $f(p_n")$ 608 to the change detection module 610.

The change detection module 610 can utilize the accumulated LLR received as $f(p_n")$ 608 to determine, at step 810, a value for a change bit $b_n$, which can indicate whether a change condition is detected for the nth sample $p_n$ of the performance signal p 164. The change detection module 610 can do so using the dual threshold test illustrated in steps 506, 512 of FIG. 5 and in FIG. 7. For example, if the accumulated LLR is in the high region 706 (i.e., greater than or equal to the high threshold $T_H$), the change bit $b_n$ can be set to "zero," indentifying the first operating mode (corresponding to the first mode module 132) of the adaptation module 130. If the accumulated LLR is in the low region 702 (i.e., less than or equal to the low threshold TL), the change bit $b_n$ can be set to "one,"

indentifying the second operating mode of the adaptation module 130. If the accumulated LLR is in the gap region 704, the change bit $b_n$ can be set to the value of the previous change bit $b_{n-1}$.

At step 812, the change detection module 610 can increment n and then repeat steps 806 through 810. During each pass through steps 806 to 810, the function module 606 can, for the new value of n, determine the LLR of $\hat{p}_n$ and add the LLR of $\hat{p}_n$ to the accumulated LLR at steps 806, 808. The change detection module 810 can then determine the value of the change bit $b_n$ for the new value of n and increment n again step 812. The function module 606 and the change detection module 610 can thus repeatedly perform steps 806 on each sample $\hat{p}_n$ of a smoothed performance signal p provided by the signal smoothing module 602 to produce a sequence of change bits $b_n$ 612, which can be provided to the fusion module 614 (see FIG. 6). FIG. 9 illustrates an example configuration of the fusion module 614 for performing a q-of-k fusion test on the bits $b_n$ 612 from the change detection module 610.

As shown in FIG. 9, the fusion module 614 can comprise k−1 delay modules 902 connected in series and a q-of-k module 904. The first delay module 902 can receive the change detection signal 612 comprising a sequence of change bits $b_n$ as discussed above. Each delay module 902 can delay a change bit $b_n$ 612 by a one-bit time period so that k of the change bits $b_n$, $b_{n-1}$, $b_{n-2}$, ... $b_{n-k-1}$ are provided simultaneously to the q-of-m module 904. The fusion signal z 616 output by the q-of-k module 804 can comprise a series of bits $z_n$. Each such bit $z_n$ can correspond to a change bit $b_n$ and thus one of the performance signal samples $p_n$ and can indentify an operating mode for the adaptation module 130. For example, for each change bit $b_n$ and thus each nth sample $\hat{p}_n$ of the smoothed performance signal p, the fusion module 614 sets the bit $z_n$ 616 positive (i.e., logical "one")—indicating that the operating mode of the adaptation module 130 is to be set to the second operating mode—only if q of the preceding k change bits $b_n$ 612 identify the second operating mode. Similarly, the fusion module 614 sets the bit $z_n$ 616 negative (i.e., logical "zero")—indicating that the operating mode of the adaptation module 130 is to be set to the first operating mode—only if q of the preceding k change bits $b_n$ 612 indentify the first operating mode. Otherwise, the fusion module 614 can set the bit $z_n$ 616 to the value of the preceding bit $z_{n-1}$ 616, which results in no change to the operating mode of the adaptation module 130. As shown in FIG. 6, the set module 618 in FIG. 6 can output the mode select signal 168 in accordance with the fusion bits $z_n$ 616.

Referring again to the q-of-k module 904 of FIG. 9, q can be one, in which case the q-of-k module 816 is a logical "or" fusion function. As another example, q can be m, in which case the q-of-k module 816 is a logical "and" fusion function. As yet another example, q can be between two and k−1, in which case the q-of-k module 816 is a logical "q of m" fusion function. If q is greater than one half of k, the q-of-k module 816 is a logical "majority rule" fusion function.

Figure 10:
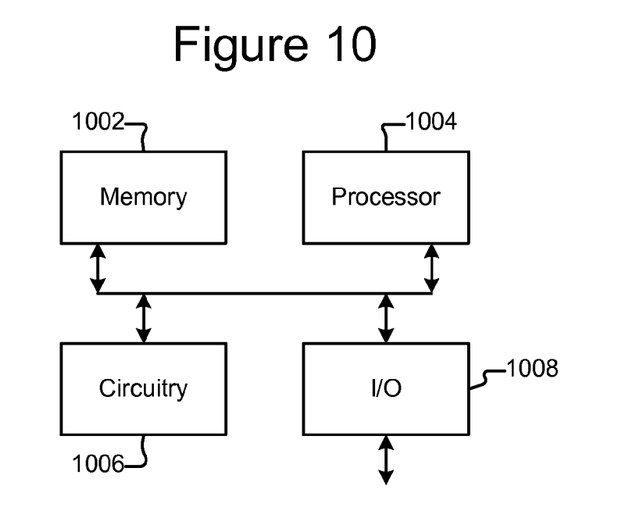
FIG. 10 illustrates an example physical configuration of any of the processors or modules by which any of the processes shown in FIGS. 1-9 can be performed.

FIG. 10 illustrates an example physical configuration of any of the modules or processors described herein including the adaptive processor 108, the adaptation module 130, the first mode module 132, the second mode module 134, the mode control module 160, the signal smoothing module 602, the function module 606, the change detection module 610, the fusion module 614, the set module 618, the delay modules 902, and the q-of-m module 904.

FIG. 10 illustrates a digital memory 1002 (e.g., a semiconductor, magnetic, light, or the like based memory device), a processor 1004 (e.g., a digital microprocessor, microcontroller, computer, computer system, or the like), circuitry 1006, and input/output hardware 1008.

Digital instructions (e.g., software, firmware, microcode, or the like) can be stored in the memory 1002 (e.g., as non-transitory signals) and executed by the processor 1004 to perform any of the functions (e.g., in any of the flow charts shown in FIGS. 2, 3, 4, 5, and 8) of any of the modules or processors described herein. Each such module can thus comprise digital instructions stored in the memory 1002 and executed by the processor 1004. The circuitry 1006 can comprise analog and/or digital circuitry, which can be configured to perform any of the functions (e.g., in any of the flow charts shown in FIG. 2, 3, 4, 5, or 8) of any of the modules or processors described herein. Each such module can thus comprise hardwired analog and/or digital circuitry in circuitry 1006. Moreover, any of the processors or modules described herein can both comprise digital instructions stored in the memory 1002 and executed by the processor 1004 and/or analog and/or digital circuitry of the circuitry 1006.

Although specific embodiments and applications of the invention have been described in this specification, these embodiments and applications are exemplary only, and many variations are possible.

We claim:

1. A process of controlling an operating mode of a multi-mode parameter adaptation circuit in a communications receiver, said process comprising:

processing with an adaptive processor digital samples $y_n$ of a received signal y comprising symbols to produce processed digital samples $\hat{x}_n$, where n is an integer indicating an $n^{th}$ one of said samples;

generating with a multi-mode parameter adaptation circuit in a first of a plurality of operating modes parameters for said adaptive processor that minimize an error between said processed digital samples $\hat{x}_n$ and a desired output of said adaptive processor;

applying with a mode control circuit a mathematical function $f$ to a performance signal p indicative of an operating condition of said receiver; and upon detecting with said mode control circuit a change condition in a result of said applying said mathematical function $f$ to a version of said performance signal p, changing with said mode control circuit an operating mode of said adaptation circuit to a second of said plurality of operating modes, wherein said multi-mode parameter adaptation circuit generates said parameters in said second operating mode, wherein:

said result of applying said mathematical function $f$ to said version of said performance signal p is a plurality of digital samples, said change condition comprises q of k sequential ones of said digital samples having a value that corresponds to said second operating mode, k is an integer greater than one, q is an integer between one and k inclusive, a one of said digital samples corresponds only to said first operating mode if said value of said one of said digital samples is greater than or equal to a first threshold, said one of said digital samples corresponds only to said second operating mode if said value of said one of said digital samples is less than or equal to a second threshold, and said first threshold is greater than said second threshold.

2. The process of claim 1, wherein in said first operating mode, said adaptation circuit generates said parameters in accordance with a statistics-directed algorithm in which said error corresponds to a difference between said processed digital samples $\hat{x}_n$ and pre-determined statistics corresponding to dispersions of a constellation of said symbols.

3. The process of claim 2, wherein in said second operating mode, said adaptation circuit generates said parameters in accordance with a decision-directed algorithm in which said error corresponds to a difference between said processed digital samples $\hat{x}_n$ and said symbols as decoded from said processed digital samples $\hat{x}_n$.

4. The process of claim 3, wherein said performance signal p corresponds to an error rate in said received signal y.

5. The process of claim 1, wherein said change condition comprises said result of said applying moving from a first band of values to a second band of values, wherein said first band of values is separated from said second band of values by a gap of values.

6. The process of claim 5, wherein:
   said first band of values is greater than or equal to a high threshold value,
   said second band of values is less than or equal to a low threshold value, and
   said high threshold is greater than said low threshold.

7. The process of claim 5 further comprising smoothing said performance signal p to produce a smoothed performance signal $\hat{p}$, wherein said applying comprises applying said function $f$ to said smoothed performance signal $\hat{p}$.

8. The process of claim 5, wherein said function $f$ is a log likelihood ratio function.

9. The process of claim 1, wherein said mathematical function $f$ comprises an accumulating log likelihood ratio (LLR) function.

10. The process of claim 1 further comprising, upon detecting said change condition, changing with said mode control circuit said performance signal p from a first form to a second form.

11. The process of claim 10, wherein said performance signal p in said first form corresponds to a difference between said processed digital samples $\hat{x}_n$ and pre-determined statistics corresponding to dispersions of a constellation of said symbols.

12. The process of claim 11, wherein said performance signal p in said second form corresponds to a difference between said processed digital samples $\hat{x}_n$ and said symbols as decoded from said processed digital samples $\hat{x}_n$.

13. The process of claim 1, wherein said performance signal p corresponds to a difference between said processed digital samples $\hat{x}_n$ and pre-determined statistics corresponding to dispersions of a constellation of said symbols.

14. The process of claim 1, wherein at least one of said adaptation circuit and said mode control circuit comprise at least one of:
   a digital memory configured to store digital instructions and a processor configured to execute ones of said digital instructions, and/or
   digital circuitry.

15. A process of controlling an operating mode of a multi-mode parameter adaptation circuit in a communications receiver, said process comprising:
   processing with an adaptive processor digital samples $y_n$ of a received signal y comprising symbols to produce processed digital samples $\hat{x}_n$, where n is an integer indicating an $n^{th}$ one of said samples;
   generating with a multi-mode parameter adaptation circuit in a first of a plurality of operating modes parameters for said adaptive processor that minimize an error between said processed digital samples $\hat{x}_n$ and a desired output of said adaptive processor;
   monitoring a performance signal p indicative of an operating condition of said receiver; and
   upon detecting a change condition in said performance signal p, changing an operating mode of said adaptation circuit to a second of said plurality of operating modes, wherein said multi-mode parameter adaptation circuit generates said parameters in said second operating mode,
wherein:
   said monitoring comprises applying a function $f$ to a version of said performance signal p,
   said change condition comprises a result of said applying moving from a first band of values to a second band of values, wherein said first band of values is separated from said second band of values by a gap of values,
   said performance signal p comprises digital samples $p_n$,
   said monitoring comprises outputting a change bit $b_n$ corresponding to one of said digital samples $p_n$,
   wherein said outputting comprises:
      setting said change bit $b_n$ to identify a first operating mode of said adaptation circuit if said result of said applying said function $f$ to said version of said digital sample $p_n$ is greater than or equal to a high threshold, or
      setting said change bit $b_n$ to identify a second operating mode of said adaptation circuit if said result of said applying said function $f$ to said version of said digital sample $p_n$ is less than or equal to a low threshold.

16. The process of claim 15, wherein said monitoring further comprises:
   performing a q-of-k fusion test on k of said change bits $b_n$ to $b_{n-k-1}$,
   outputting a fusion bit $z_n$, wherein said outputting comprises:
      setting said fusion bit $z_n$ to identify said first operating mode of said adaptation circuit if q of said k change bits $b_n$ to $b_{n-k-1}$ have said value identifying said first operating mode, or
      setting said fusion bit $z_n$ to identify said second operating mode of said adaptation circuit if q of said k change bits $b_n$ to $b_{n-k-1}$ have said value identifying said second operating mode,
   wherein k is an integer greater than one, and q is an integer between one and k inclusive.

17. The process of claim 16, wherein q equals k.

18. The process of claim 16, wherein q is greater than one half of k.

19. The process of claim 15, wherein said adaptation circuit comprises at least one of:
   a digital memory configured to store digital instructions and a processor configured to execute ones of said digital instructions, and/or
   digital circuitry.

20. A signal processing apparatus comprising:
   a multi-mode parameter adaptation circuit configured to generate, in a plurality of different operating modes, parameters for an adaptive processor that minimizes an error between processed digital samples $\hat{x}_n$ output by said adaptive processor and a desired output of said adaptive processor, where n is an integer indicating an $n^{th}$ one of said samples; and
   a mode control circuit configured to apply a mathematical function $f$ to a version of a performance signal p indicative of an operating condition of said signal processing apparatus, and upon detecting a change condition in a result of said applying said mathematical function $f$ to said version of said performance signal p, change an operating mode of said adaptation circuit, wherein:
said result of applying said mathematical function $f$ to said version of said performance signal p is a plurality of digital samples,
said change condition comprises q of k sequential ones of said digital samples having a value that corresponds to said second operating mode,
k is an integer greater than one,
q is an integer between one and k,
a one of said digital samples corresponds only to said first operating mode if said value of said one of said digital samples is greater than or equal to a first threshold,
said one of said digital samples corresponds only to said second operating mode if said value of said one of said digital samples is less than or equal to a second threshold, and
said first threshold is greater than said second threshold.

21. The apparatus of claim 20, wherein said adaptation circuit comprises:
a first mode circuit configured to generate said parameters in accordance with a first algorithm, and
a second mode circuit configured to generate said parameters in accordance with a second algorithm,
wherein said first algorithm is different than said second algorithm.

22. The apparatus of claim 21, wherein:
said first algorithm is a statistics-directed algorithm in which said error corresponds to a difference between said processed digital samples $\hat{x}_n$ and pre-determined statistics corresponding to dispersions of a constellation of symbols to be decoded from said digital samples $\hat{x}_n$; and
said second algorithm is a decision-directed algorithm in which said error corresponds to a difference between said processed digital samples $\hat{x}_n$ and said symbols decoded from said digital samples $\hat{x}_n$.

23. The apparatus of claim 20, wherein said mode control circuit is further configured to detect said change condition in said result of said applying said mathematical function $f$ to said version of said performance signal p.

24. The apparatus of claim 23, wherein said mode control circuit is further configured to smooth said performance signal p to produce a smoothed performance signal $\hat{p}$ and apply said function $f$ to said smoothed performance signal $\hat{p}$.

25. The apparatus of claim 23, wherein said function $f$ is a log likelihood ratio.

26. The apparatus of claim 23, wherein:
said mode control circuit is configured to detect said change condition if said result of said applying said mathematical function $f$ to said version of said performance signal p is greater than or equal to a high threshold or is less than or equal to a low threshold, and
said high threshold is greater than said low threshold.

27. The apparatus of claim 20, wherein said mathematical function $f$ comprises an accumulating log likelihood ratio (LLR) function.

28. The apparatus of claim 20, wherein said mode control circuit is further configured to, upon detecting said change condition, change said performance signal p from a first form to a second form.

29. The apparatus of claim 20, wherein at least one of said adaptation circuit, said mode control circuit, said first mode circuit, and said second mode circuit comprise at least one of:
a digital memory configured to store digital instructions and a processor configured to execute ones of said digital instructions, and/or
digital circuitry.

30. A signal processing apparatus comprising:
a multi-mode parameter adaptation circuit configured to generate, in a plurality of different operating modes, parameters for an adaptive processor that minimizes an error between processed digital samples $\hat{x}_n$ output by said adaptive processor and a desired output of said adaptive processor, wherein n is an integer indicating an $n^{th}$ one of said samples; and
a mode control circuit configured to monitor a performance signal p indicative of an operating condition of said signal processing apparatus, and upon detecting a change condition in said performance signal p, change an operating mode of said adaptation circuit,
wherein said mode control circuit comprises:
a function circuit configured to apply a function $f$ to a version of said performance signal p, and
a change detection circuit configured to detect said change condition in an output of said function circuit, and
wherein:
said performance signal p comprises digital samples $p_n$,
said change detection circuit is configured to output, for a corresponding one of said digital samples $p_n$, a change bit $b_n$:
identifying a first operating mode of said adaptation circuit if said output of said function circuit corresponding to said digital sample $p_n$ is greater than or equal to a high threshold, or
identifying a second operating mode of said adaptation circuit if an output of said function circuit corresponding to said digital sample $p_n$ is less than or equal to a low threshold.

31. The apparatus of claim 30, wherein said mode control circuit further comprises a fusion circuit configured to perform a q-of-k fusion test on k of said change bits $b_n$ to $b_{n-k-1}$ output by said change detection circuit, wherein said function circuit is configured to output a fusion bit $z_n$:
identifying said first operating mode of said adaptation circuit if q of said k change bits $b_n$ to $b_{n-k-1}$ have said value identifying said first operating mode, or
identifying said second operating mode of said adaptation circuit if q of said k change bits $b_n$ to $b_{n-k-1}$ have said value identifying said second operating mode, wherein k is an integer greater than one, and q is an integer between one and k inclusive.

32. The apparatus of claim 31, wherein q equals k.

33. The apparatus of claim 31, wherein q is greater than one half of k.

34. The apparatus of claim 31, wherein at least one of said adaptation circuit, said mode control circuit, said function circuit, said change detection circuit, and said fusion circuit comprise at least one of:
a digital memory configured to store digital instructions and a processor configured to execute ones of said digital instructions, and/or
digital circuitry.

\* \* \* \* \*